H. J. BADDELEY.

Animal-Traps.

No. 133,557. Patented Dec. 3, 1872.

UNITED STATES PATENT OFFICE.

HENRY J. BADDELEY, OF NAPA, CALIFORNIA.

IMPROVEMENT IN ANIMAL-TRAPS.

Specification forming part of Letters Patent No. 133,557, dated December 3, 1872.

*To all whom it may concern:*

Be it known that I, HENRY J. BADDELEY, of Napa, in the county of Napa and State of California, have invented a new and Improved Animal-Trap; and I do hereby declare that the following is a full and exact description of the same, reference being had to the accompanying drawing and to the letters of reference marked thereon.

The object of my invention is to provide an improvement in animal-traps; and it consists, mainly, in the employment of an inclined tilting platform pivoted in a suitable wire or other cage, so as to present no obstruction to the entrance of the animal from one end, which is down upon the ground.

The bait is fixed at or near the upper end of the incline, and when the animal passes the point of suspension the incline tilts and the animal passes into the cage.

In order to prevent his escape when the incline begins to tilt, a sliding door is constructed to be operated by the movements of the incline, and it shuts down just behind the animal, so that he must go forward.

Figure 1:
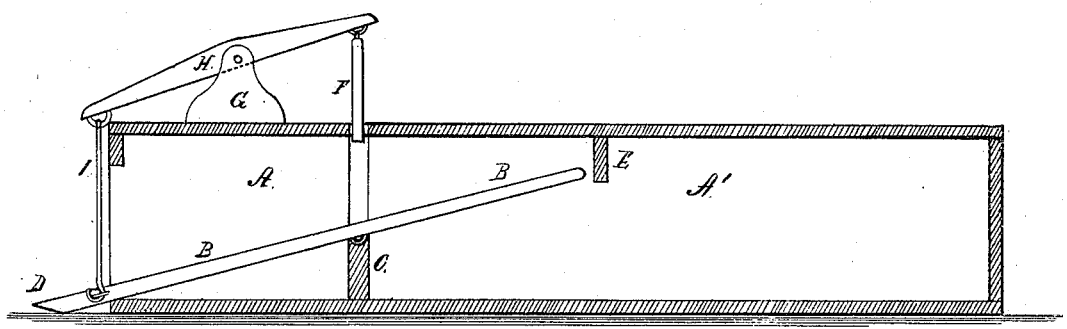
Figure 2:
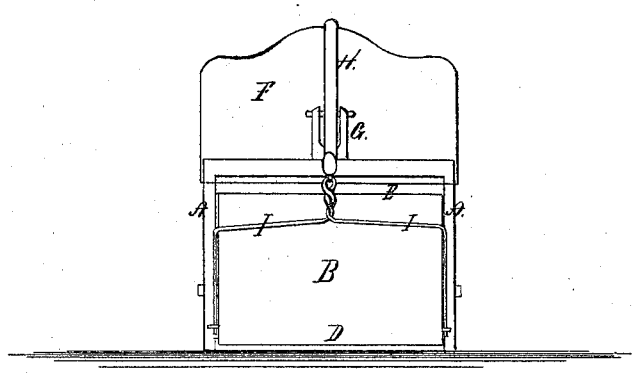

Referring to the accompanying drawing for a more complete explanation of my invention, Figure 1 is a side sectional elevation of my trap. Fig. 2 is an end view.

A is a suitable box or cage, which may be made of wire, or it may be of wood with lattice or glass sides, and behind this box is the retaining-cage A' for holding the animal after it is caught. A long, lightly-balanced incline, B, is pivoted at the top of the low half partition C near the center of the box, so that its outward end D will, under ordinary circumstances, remain down. The bait is secured at or near the upper end E of the incline, which is left free to move when the animal has passed the center or point of suspension. In order to prevent the sudden backing out and escape of the animal I construct a sliding door, F, which moves up and down in grooves just over the point of suspension at $c$. A standard, G, is fixed to the top of the box A, and serves as a fulcrum for the lever H, one end of which is attached to the top of the door F. The other end is connected with the outward end of the incline by means of a light frame, I, so that when the weight of the animal tilts the incline the lever will act on the sliding door and instantly close it. This leaves no way for the animal but to run forward, which he does, and the incline instantly resumes its former position and is set for another.

By this construction I provide a simple, cheap, and efficient animal-trap, self-setting and very secure.

Having thus described my invention, what I claim, and desire to secure by Letters Patent, is—

The tilting incline B, in combination with the sliding door F, operating-lever H, and connecting-frame I, substantially as and for the purpose herein described and shown.

In witness whereof I have hereunto set my hand.

HENRY JOHN BADDELEY.

Witnesses:
GEO. H. STRONG,
JOHN SMITH.